United States Patent
Drobny et al.

(10) Patent No.: US 6,567,732 B2
(45) Date of Patent: May 20, 2003

(54) METHOD AND A DEVICE FOR EVALUATING SENSOR SIGNALS FROM A SEAT MAT IN A VEHICLE SEAT

(75) Inventors: Wolfgang Drobny, Heilbronn (DE); Ruediger Giesel, Stuttgart (DE); Rene Wolf, Schwieberdingen (DE); Hermann Maier, Markgroeningen (DE); Reiner Marchthaler, Gingen (DE); Ralf Henne, Sachsenheim (DE); Thomas Lich, Schwaikheim (DE); Frank Mack, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/962,373

(22) Filed: Sep. 24, 2001

(65) Prior Publication Data

US 2002/0072839 A1 Jun. 13, 2002

(30) Foreign Application Priority Data

Sep. 23, 2000 (DE) .......................... 100 47 190

(51) Int. Cl.$^7$ .......................... B60R 22/00; G06F 17/00
(52) U.S. Cl. .......................... 701/45; 180/271; 280/734; 280/735; 340/667
(58) Field of Search .......................... 701/45; 280/734, 280/735; 340/667; 180/271

(56) References Cited

U.S. PATENT DOCUMENTS

| 5,732,375 A | * | 3/1998 | Cashler | 180/273 |
| 5,744,718 A | * | 4/1998 | Okada | 73/514.33 |
| 6,005,485 A | * | 12/1999 | Kursawe et al. | 180/271 |

* cited by examiner

*Primary Examiner*—William A. Cuchlinski, Jr.
*Assistant Examiner*—Olga Hernandez
(74) *Attorney, Agent, or Firm*—Kenyon & Kenyon

(57) ABSTRACT

A method and a device are for evaluating sensor signals from a seat mat in a vehicle seat, the signals functioning to characterize the sensors in the seat mat as active and inactive. In this manner, a linear evaluation method is performed to make possible a weight classification of passengers situated on the vehicle seat. For this purpose, a seat profile is generated using the active and inactive sensors.

1 Claim, 2 Drawing Sheets

METHOD AND A DEVICE FOR EVALUATING SENSOR SIGNALS FROM A SEAT MAT IN A VEHICLE SEAT

FIELD OF THE INVENTION

The present invention relates to a method and to a device for evaluating sensor signals from a seat mat in a vehicle seat.

BACKGROUND INFORMATION

K. Brillen, L. Federspiel, P. Schockmehl, B. Serban, and W. Sherrill, "Occupant Classification System for Smart Restraint Systems," SAE paper 1999, pp. 33–38, describes pressure sensors, which are used in a seat mat for a vehicle seat and are arranged in a matrix. In response to increased resistance, the pressure sensors have reduced electrical resistance. In this context, the pressure sensors can be divided into active and inactive matrix elements. From these matrix elements, a seat profile can be generated, so as to determine features for classifying the passengers.

SUMMARY

In contrast, the method and the device according to the present invention for evaluating sensor signals from a seat mat in a vehicle seat have the advantage that the sensors are divided in binary fashion into active and inactive sensors. This arrangement has the advantage that the sensor signals are easier to process, the processing hardware may be more easily configured, because only binary information has to be processed from the sensors in the seat mat and not absolute values, and a nonlinear relationship between the pressure exerted and the measured resistance value of the sensor is insignificant. Another advantage is that the calibration of the seat mat is highly simplified because only a threshold value has to be determined. The pressure-sensitive sensors in the seat mat may be configured more simply because the absolute resistance values no longer have meaning. In addition, the device according to the present invention may be robust with respect to dispersions in the production process, because the threshold may be set using software. In addition, the device according to the present invention is less susceptible to disturbance with regard to production and operating conditions.

Advantageous improvements of the method and the device according to the present invention are possible for evaluating sensor signals from a seat mat in a vehicle seat.

The threshold value which distinguishes between active and inactive sensors may be set as a function of the installation of the seat mat in the vehicle seat. Therefore, it is possible to take into account the individual installation conditions and varying seat designs. This leads to increased precision in the measured sensor activity.

On the base of the active and inactive sensors, a seat profile may be generated which makes possible a weight classification of the person sitting on the vehicle seat. In this context, it is specifically possible to establish whether it is a person or an object and whether the person is large, small, heavy, or light.

The processor of the device according to the present invention may be connected to a restraint system and in the process specifically to a control unit of the restraint system, in order to transmit the weight classification to the control unit. Thus, it is possible to trigger an air bag in an improved manner as a function of the person. If an object, for example, a box, is detected on the vehicle seat, then the air bag is not triggered for this vehicle seat.

DETAILED DESCRIPTION

The weight classification of passengers in a vehicle for the triggering of a multistage air bag is of increasing importance for the reliability and the efficiency of a restraint system, such as an air bag and a seat-belt tensioner. Multistage means that, in accordance with the passenger classification, which is determined by the weight of the passenger, a restraining force, which is a function of the stage of the air bag, is exerted for the protection of the passenger.

According to the present invention, the sensors in a seat mat that react to pressure are divided into active and inactive sensors by a threshold value comparison. Since the resistance values decline as the weight pressure on the seat mat increases, the sensors having a resistance value below the threshold value are recognized as active, whereas the sensors having a resistance value above the threshold value are recognized as inactive. A pressure prestressing of the sensors in the seat mat caused by the installation may be taken into account in the software. By dividing the sensors into active and inactive, it is possible to determine a seat profile which is used for weight classification.

Figure 1:
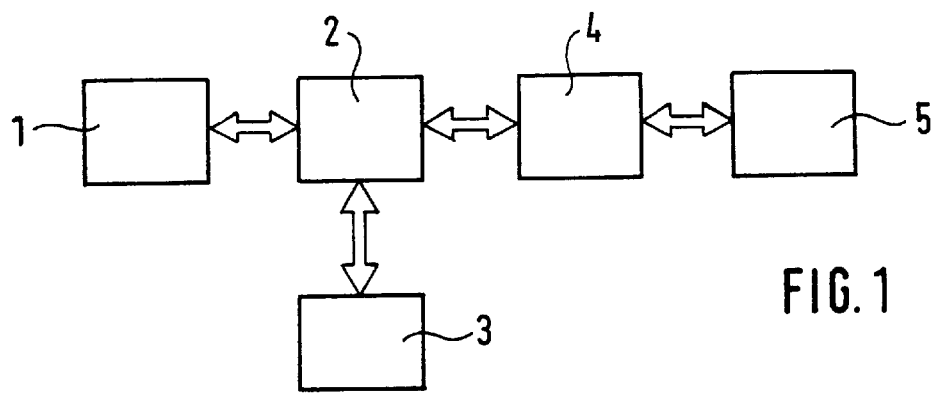
FIG. 1 is a schematic view of a device for evaluating sensor signals from a seat mat in a vehicle seat according to the present invention.

FIG. 1 schematically illustrates, as a block diagram, the device according to the present invention for evaluating a seat profile for a vehicle seat. A seat mat 1 is connected to a processor 2 via a data input/output.

Seat mat 1 sequentially supplies the individual sensor values as electrical or current values to processor 2, sensor mat 1 including an analog/digital converter, which digitizes these current values. The pressure sensors are arranged in a matrix. Processor 2 applies voltages to the rows and columns, so that in accordance with the principle of the balanced bridge, no currents flow through the pressure sensors. In response to an increased pressure, the pressure sensors have reduced resistance. If processor 2 surveys the individual pressure sensors in the sensor matrix, then processor 2 changes the voltages applied at the rows and columns, such that a current flows through an individual pressure sensor. This current is measured, is digitized by the analog/digital converter, and is then transmitted to processor 2. From the current values, processor 2 calculates the resistances of the individual pressure sensors.

Processor 2 via a second data input/output is connected to a storage unit or memory 3, which has threshold values for the comparison with the resistance values from the sensors from seat mat 1. Via a third data input/output, processor 2 is connected to a control unit 4 for a restraint system 5. Control unit 4 is connected to restraint system 5 via a second data input/output.

Processor 2, based on the threshold values from storage unit 3 and on the resistance values determined by processor 2, performs the threshold value comparison. The resistance values that are below the threshold value assure that the sensors which have demonstrated these sensor signals are recognized as active. The resistance values which are above the threshold value lead to the sensors that have generated these resistance values being recognized as inactive. The result of this threshold value comparison is determined as a seat profile having active and inactive fields at the corresponding locations of the sensors. Using the seat profile, processor 2 determines a weight classification of the person. In this context, in a corresponding seat profile, a check is first performed as to whether it is either a person or an object on the vehicle seat. This results from a comparison of the stored seat profiles and the measured seat profile. In this context, parameters such as center of gravity, the seat profile magnitude and/or the ischial tuberosity spacing are compared with the preestablished values. The value resulting from the comparison is subjected to a threshold value comparison to determine whether the measured seat profile was identified by the stored seat profile.

If it is an object located thereon, then a message is transmitted to control unit 4, that for this vehicle seat no air bags should be used. If on the basis of the seat profile a person is detected, then as a result of this seat profile a weight classification is also generated to convey to control unit 4 how the corresponding restraint system should be triggered for this vehicle seat. In this context, the conclusion is made in particular on the basis of the weight of the person. This weight estimation is produced using a preestablished relation between seat profile and weight, parameters from the seat profile such as the ischial tuberosity spacing and the seat profile magnitude being used in this context. The goal is that a 45-kg person may still be protected. For persons having a lower weight, the use of an air bag is no longer recommended due to the danger of injury by the air bag. A corresponding passenger classification on the basis of weight assures that in response to a multistage air bag a stage, and thus a restraining force, is used that corresponds to the passenger weight.

The arrangement may also be combined with an absolute weight measurement to arrive at a better weight estimate and person classification. Then, in response to a collision, control unit 4 triggers restraint system 5 as a function of this weight classification. This may be important for multistage air bags, because these multistage air bags may be triggered so as to minimize the risk of injury for the person.

Figure 2:
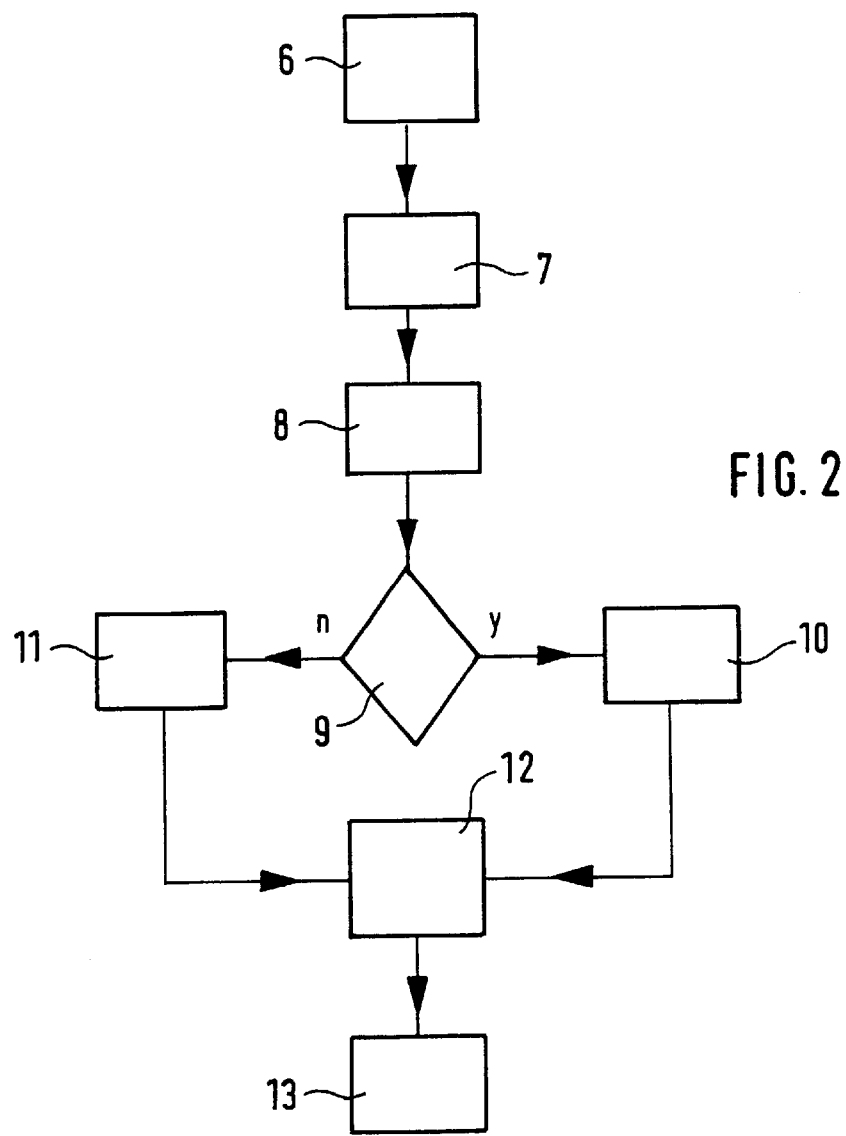
FIG. 2 is a flow chart illustrating a method for evaluating sensor signals from a seat mat in a vehicle seat according to the present invention.

FIG. 2 illustrates the method according to the present invention as a flowchart. In method step 6, resistance values are generated by the sensors in the seat mat on the basis of a weight pressure on the seat mat in the vehicle seat. In method step 7, these resistance values are read out and are transmitted to processor 2. In method step 8, processor 2 performs the threshold value comparison for the resistance values from the individual sensors, to divide the individual sensors into active and inactive sensors. In this context, in method step 9, a check is performed as to whether the resistance value is above or below the preestablished threshold value in storage unit 3. If the resistance value is above the threshold value, then in method step 10 the corresponding sensor is characterized as inactive. If the resistance value is below the threshold value from storage unit 3, then in method step 11 the sensor is characterized as active.

Then, using the characterized sensors, in method step 12, the seat profile of the seat mat in the vehicle seat is produced. In method step 13, a weight classification of the person situated on the vehicle seat is also performed. In this context, if appropriate, further measuring values (ischial tuberosity spacing and covered surface) are used. This weight classification is then used for the triggering of a restraint system, such as, for example, an air bag.

Figures 3, 4:
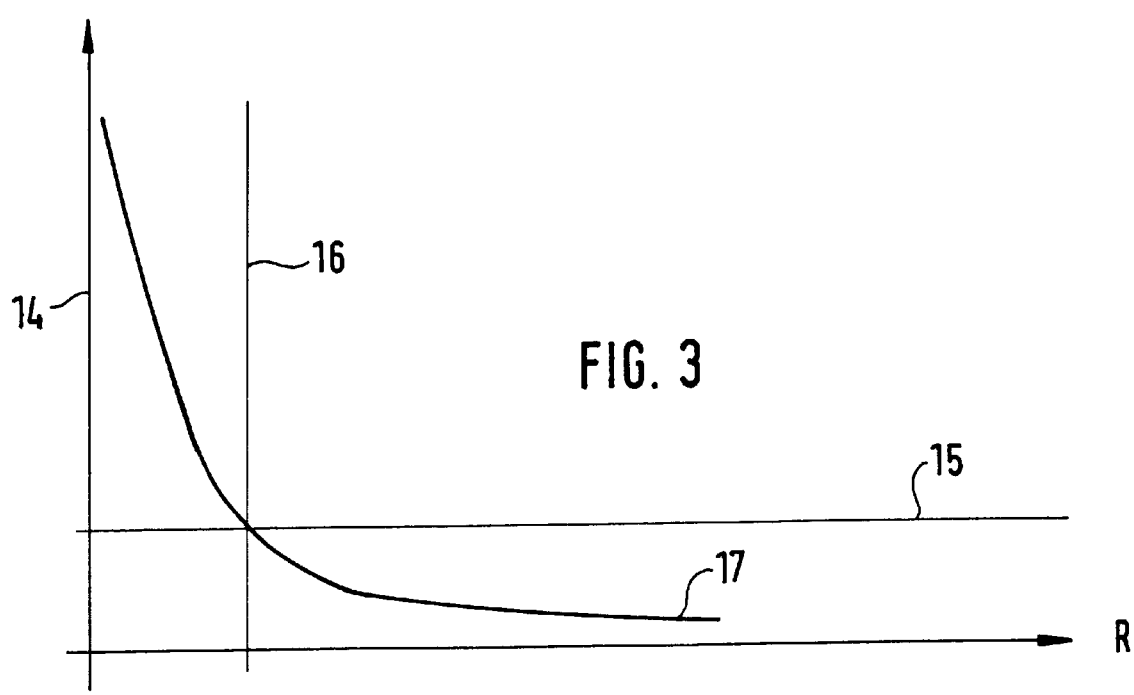
FIG. 3 is a graph illustrating a resistance characteristic curve having threshold values.
FIG. 4 illustrates an example of a seat profile.

FIG. 3 illustrates, as a graph, the functional relationship between the resistance values of the sensors and an assigned value range 14. Resistance characteristic curve 17 is a nonlinear curve, threshold values 15 and 16 also being illustrated in the diagram, which are valid in each case for corresponding resistance value R and corresponding value range 14. Only one of threshold values 15 and 16 is used. Threshold value 15 may be easier to use for value range 14. If value range 14 is below threshold value 15, then the corresponding sensor is recognized as active. If resistance value R is below threshold value 16, then the corresponding sensor is recognized as active. In the other cases, the corresponding sensors are recognized as inactive.

This arrangement results in a seat profile, which is illustrated by example in FIG. 4. The sensor matrix is illustrated schematically, the fields have an "a" representing active sensors. The sensors that are characterized by the letter "a" constitute the seat profile. On the basis of the seat profile, a weight classification of the person situated on the vehicle seat is possible, potentially in connection with further features (ischial tuberosity spacing and seat profile magnitude).

What is claimed is:

1. A method for evaluating sensor signals from a seat mat in a vehicle seat, comprising the steps of:

using resistance values from pressure sensors in the seat mat as sensor signals;

comparing the resistance values with a threshold value;

recognizing the sensors having a resistance value below the threshold value as active;

recognizing the sensors having a resistance value above the threshold value as inactive, and changing the threshold value as a function of an installation of the seat mat in the vehicle seat.

* * * * *